(12) United States Patent  
Weaver

(10) Patent No.: US 8,594,912 B2
(45) Date of Patent: Nov. 26, 2013

(54) STOP/START CONTROL SYSTEMS AND METHODS FOR INTERNAL COMBUSTION ENGINES

(75) Inventor: Richard A. Weaver, Brighton, MI (US)

(73) Assignee: GM Global Technology Operations LLC

( * ) Notice: Subject to any disclaimer, the term of this patent is extended or adjusted under 35 U.S.C. 154(b) by 299 days.

(21) Appl. No.: 13/096,440

(22) Filed: Apr. 28, 2011

(65) Prior Publication Data

US 2012/0277982 A1 Nov. 1, 2012

(51) Int. Cl.
*F02N 11/08* (2006.01)
*F02N 11/14* (2006.01)

(52) U.S. Cl.
USPC ........................................ 701/112; 123/179.4

(58) Field of Classification Search
USPC .................. 701/112, 113, 410–412, 422; 123/179.4, 179.3, 179.28; 180/65.28
See application file for complete search history.

(56) References Cited

U.S. PATENT DOCUMENTS

2006/0277495 A1* 12/2006 Obradovich ................... 715/790
2012/0226433 A1* 9/2012 Hasan et al. ................... 701/112

* cited by examiner

*Primary Examiner* — Mahmoud Gimie

(57) ABSTRACT

An auto-stop/start system for a vehicle includes an object identification module, a distance determination module, and an auto-stop/start control module. The object identification module determines a location of an object that is in a path of the vehicle. The distance determination module determines a distance between the vehicle and the location of the object. The auto-stop/start control module selectively disables provision of fuel to an engine of the vehicle while an ignition system of the vehicle is ON based on the distance.

20 Claims, 7 Drawing Sheets

STOP/START CONTROL SYSTEMS AND METHODS FOR INTERNAL COMBUSTION ENGINES

FIELD

The present disclosure relates to internal combustion engines and more particularly to stop/start engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

A vehicle may include an auto-stop/start system that increases the vehicle's fuel efficiency. The auto-start/stop system increases fuel efficiency by selectively shutting down the engine and disabling the provision of fuel to the engine while the ignition system of the vehicle is still ON (e.g., key ON). While the engine is shut down, the auto-stop/start system selectively starts up the engine when one or more start-up conditions are satisfied.

SUMMARY

An auto-stop/start system for a vehicle includes an object identification module, a distance determination module, and an auto-stop/start control module. The object identification module determines a location of an object that is in a path of the vehicle. The distance determination module determines a distance between the vehicle and the location of the object. The auto-stop/start control module selectively disables provision of fuel to an engine of the vehicle while an ignition system of the vehicle is ON based on the distance.

An auto-stop/start method for a vehicle includes: determining a location of an object that is in a path of the vehicle; determining a distance between the vehicle and the location of the object; and while an ignition system of the vehicle is ON, selectively disabling provision of fuel to an engine of the vehicle based on the distance.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
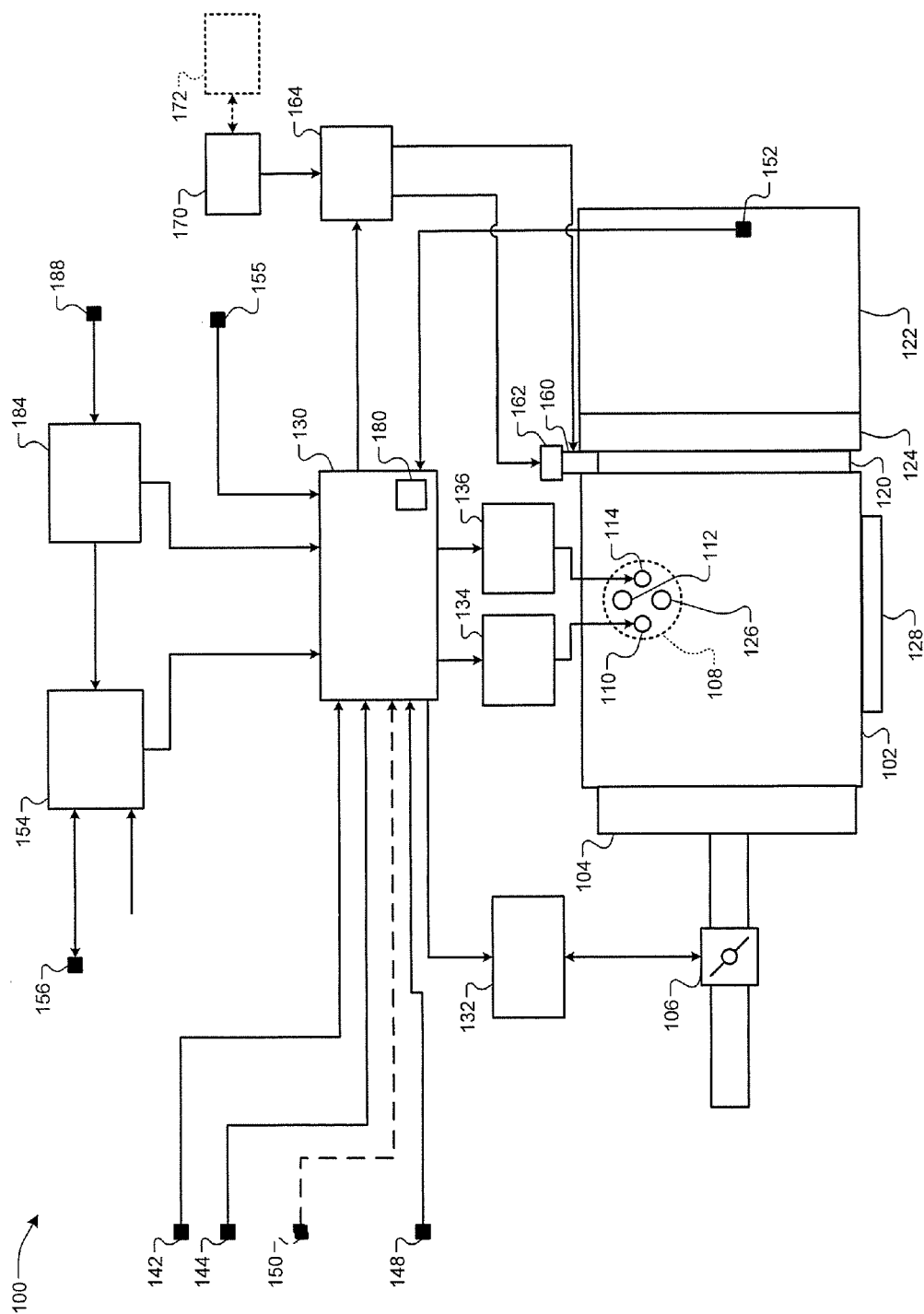
FIG. 1 is a functional block diagram of an example engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A control module selectively starts up and shuts down an engine of a vehicle when a user inputs a vehicle startup command (e.g., key on) and a vehicle shutdown command (e.g., key off), respectively. The control module may also selectively shut down and later start up the between a vehicle startup command and a vehicle shutdown command. An engine auto-stop event may refer to shutting down the engine while the ignition system of the vehicle is still ON. An engine auto-stop event may refer to starting up the engine while the engine is shut down for an auto-stop event.

The control module may selectively initiate an auto-stop event and shut down the engine, for example, when a driver applies pressure to a brake pedal. The control module may selectively initiate an auto-start event and re-start the engine when the driver removes pressure from the brake pedal. In this manner, the control module re-starts the engine so the engine is able to produce torque to propel the vehicle based on inputs of the driver.

An auto-stop/start module according to the present disclosure initiates auto-stop and auto-start events based on a first distance between the vehicle and an object that is in a first path of the vehicle. The object being in the path of the vehicle may prompt the user to slow or stop the vehicle. A cruise control module may identify objects around the vehicle including objects in the path of the vehicle using, for example, radar, laser, and/or another suitable type of object identification.

The auto-stop/start module additionally or alternatively initiates auto-stop and auto-start events based on a second distance between the vehicle and a predetermined stopping location that is in a second path of the vehicle. The predetermined stopping location may be a previously identified location where drivers are to stop or slow their vehicles, such as the location of a stop sign, the location of a yield sign, etc. The predetermined stopping location may be determined, for example, based on a location of the vehicle provided by a global positioning system (GPS).

Referring now to FIG. 1, a functional block diagram of an example engine system 100 is presented. The engine system 100 includes an engine 102 that combusts an air/fuel mixture to produce drive torque for a vehicle. Air is drawn into an intake manifold 104 through a throttle valve 106. The throttle valve 106 regulates air flow into the intake manifold 104. Air within the intake manifold 104 is drawn into one or more cylinders of the engine 102, such as cylinder 108.

One or more fuel injectors, such as fuel injector 110, inject fuel that mixes with air to form an air/fuel mixture. In various implementations, one fuel injector may be provided for each cylinder of the engine 102. The fuel injectors may be associated with an electronic or mechanical fuel injection system, a jet or port of a carburetor, or another fuel injection system. The fuel injectors may be controlled to provide a desired air/fuel mixture for combustion, such as a stoichiometric air/fuel mixture.

An intake valve 112 opens to allow air into the cylinder 108. A piston (not shown) compresses the air/fuel mixture within the cylinder 108. In some engine systems, a spark plug 114 initiates combustion of the air/fuel mixture within the cylinder 108. In other types of engine systems, such as diesel engine systems, combustion may be initiated without the spark plug 114.

Combustion of the air/fuel mixture applies force to the piston, which rotatably drives a crankshaft (not shown). The engine 102 outputs torque via the crankshaft. A flywheel 120 is coupled to the crankshaft and rotates with the crankshaft. Torque output by the engine 102 is selectively transferred to a transmission 122 via a torque transfer device 124. More specifically, the torque transfer device 124 selectively couples the transmission 122 to the engine 102 and de-couples the transmission 122 from the engine 102. The torque transfer device 124 may include, for example, a torque converter and/or one or more clutches. The transmission 122 may include, for example, a manual transmission, an automatic transmission, a semi-automatic transmission, an auto-manual transmission, or another suitable type of transmission.

Exhaust produced by combustion of the air/fuel mixture is expelled from the cylinder 108 via an exhaust valve 126. The exhaust is expelled from the cylinders to an exhaust system 128. The exhaust system 128 may treat the exhaust before the exhaust is expelled from the exhaust system 128. Although one intake and exhaust valve are shown and described as being associated with the cylinder 108, more than one intake and/or exhaust valve may be associated with each cylinder of the engine 102.

An engine control module (ECM) 130 controls the torque output of the engine 102. For example only, the ECM 130 may control the torque output of the engine 102 via various engine actuators. The engine actuators may include, for example, a throttle actuator module 132, a fuel actuator module 134, and a spark actuator module 136. The engine system 100 may also include other engine actuators, and the ECM 130 may control the other engine actuators.

Each engine actuator controls an operating parameter based on a signal from the ECM 130. For example only, the throttle actuator module 132 may control opening of the throttle valve 106, the fuel actuator module 134 may control amount and timing of fuel injection, and the spark actuator module 136 may control spark timing.

The ECM 130 may control the torque output of the engine 102 based on, for example, driver inputs and various other inputs. The other inputs may include, for example, inputs from a transmission system, inputs from a hybrid control system, inputs from a stability control system, inputs from a chassis control system, and other suitable vehicle systems.

The driver inputs may include, for example, an accelerator pedal position (APP), a brake pedal position (BPP), and vehicle operation commands. An APP sensor 142 measures position of an accelerator pedal (not shown) and generates the APP based on the position. A BPP sensor 144 monitors actuation of a brake pedal (not shown) and generates the BPP accordingly. The vehicle operation commands may be made via actuation of, for example, an ignition key, one or more ignition buttons/switches, and/or one or more suitable vehicle ignition system inputs 148.

In vehicles having a manual transmission, the driver inputs provided to the ECM 130 may also include a clutch pedal position (CPP). A CPP sensor 150 monitors actuation of a clutch pedal (not shown) and generates the CPP accordingly. The clutch pedal may be actuated to couple the transmission 122 to the engine 102 and de-couple the transmission 122 from the engine 102.

In some implementations, the APP sensor 142, the BPP sensor 144, and the CPP sensor 150 may measure the position of the associated pedal and generate the APP, the BPP, and the CPP, respectively, based on the measured position of the associated pedal. In other implementations, the APP sensor 142, the BPP sensor 144, and the CPP sensor 150 may each include one or more switches and may generate the APP, the BPP, and the CPP, respectively, indicating whether the associated pedal is being actuated away from a predetermined resting position. While the APP sensor 142, the BPP sensor 144, and the CPP sensor 150 are shown and described, one or more additional APP, BPP, and/or CPP sensors may be provided.

A driver of the vehicle may apply brakes (not shown) of the vehicle by actuating the brake pedal away from the predetermined resting position of the brake pedal. For example only, the brakes may include drum brakes, disc brakes, and/or another suitable type of vehicle brakes. The driver may input a desire to accelerate the vehicle by actuating the accelerator pedal away from the predetermined resting position of the accelerator pedal. The driver may de-couple the engine 102 from the transmission 122, via the torque transfer device 124, by actuating the clutch pedal away from the predetermined resting position of the clutch pedal. In other implementations, the coupling and de-coupling of the engine 102 and the transmission 122 via the torque transfer device 124 (e.g., a torque converter) may be controlled by a transmission control module (not shown).

The driver inputs may also include one or more cruise control inputs. A cruise control module 154 may provide cruise control inputs to the ECM 130 based on user inputs and vehicle surroundings inputs. The user inputs may include, for example, a speed set input, a cruise control on/off input, a resume speed input, and/or one or more suitable user inputs.

The ECM 130 may selectively make control decisions for the engine system 100 based on one or more parameters. A vehicle speed sensor 152 measures speed of the vehicle and generates a vehicle speed based on the speed. For example only, the vehicle speed sensor 152 may generate the vehicle speed based on a transmission output shaft speed (TOSS), one or more wheel speeds, and/or another suitable measure of the vehicle speed. The ECM 130 may also receive operating parameters measured by other sensors 155, such as oxygen in the exhaust, engine speed, engine coolant temperature, intake air temperature, mass air flowrate, oil temperature, manifold absolute pressure, and/or other suitable parameters.

The ECM 130 selectively shuts down the engine 102 when a vehicle shutdown command is received. For example only, the ECM 130 may disable the injection of fuel, disable the provision of spark, and perform other engine shutdown operations to shut down the engine 102 when a vehicle shutdown command is received.

While the engine 102 is shut down pursuant to the receipt of a vehicle shutdown command (e.g., key OFF), a starter motor 160 is selectively engaged with the engine 102 to initiate an engine/vehicle startup event. For example only, the starter motor 160 may be engaged with the engine 102 when a vehicle startup command is received. The starter motor 160 may engage the flywheel 120 or other suitable component(s) that may drive rotation of the crankshaft.

A starter motor actuator 162, such as a solenoid, selectively engages the starter motor 160 with the engine 102. A starter actuator module 164 controls the starter motor actuator 162, and therefore the starter motor 160, based on signals from the ECM 130. For example only, the ECM 130 may command engagement of the starter motor 160 when the vehicle startup command is received.

The starter actuator module 164 selectively applies current to the starter motor 160 when the starter motor 160 is engaged with the engine 102. For example only, the starter actuator module 164 may include a starter relay. The application of current to the starter motor 160 drives rotation of the starter motor 160, and the engaged portion of the starter motor 160 drives rotation of the crankshaft. Driving rotation of the crankshaft to start the engine 102 may be referred to as engine cranking.

Once the engine 102 is deemed running after the engine startup event, the starter motor 160 may be disengaged from the engine 102, and the flow of current to the starter motor 160 may be discontinued. The engine 102 may be deemed running, for example, when the engine speed exceeds a predetermined speed, such as a predetermined idle speed. For example only, the predetermined idle speed may be approximately 700 rpm. Engine cranking may be said to be completed when the engine 102 is deemed running.

The current provided to the starter motor 160 may be provided by, for example, a battery 170. The engine system 100 may or may not include one or more electric motors, such as electric motor (EM) 172. The EM 172 may selectively draw electrical power to, for example, supplement the torque output of the engine 102. The EM 172 may also selectively function as a generator and selectively apply a braking torque to generate electrical power. Generated electrical power may be used to, for example, charge the battery 170, provide electrical power to one or more other EMs (not shown), provide electrical power to other vehicle systems, and/or other suitable uses.

Other than commanded vehicle startups and vehicle shutdowns, the ECM 130 may include an auto-stop/start module 180 that selectively initiates auto-stop events and auto-start events of the engine 102. An auto-stop event includes shutting down the engine 102 when one or more predetermined auto-stop criteria are satisfied when vehicle shutdown has not been commanded (e.g., before key OFF). The engine 102 may be shut down and the provision of fuel to the engine 102 may be disabled, for example, to increase fuel economy (by decreasing fuel consumption).

While the engine 102 is shut down during an auto-stop event, the auto-stop/start module 180 may selectively initiate an auto-start event. An auto-start event may include, for example, enabling the provision of fuel to the engine 102, enabling the provision of spark, engaging the starter motor 160 with the engine 102, and applying current to the starter motor 160 to start the engine 102.

The auto-stop/start module 180 may selectively initiate auto-stop events and auto-start events, for example, based on the APP, the BPP, the vehicle speed, and/or one or more other suitable parameters. For example only, the auto-stop/start module 180 may initiate an auto-stop event when the brake pedal is depressed and the vehicle speed is less than a predetermined speed. While the engine 102 is shutdown for the auto-stop event, the auto-stop/start module 180 may selectively initiate an auto-start event when the brake pedal is released.

The auto-stop/start module 180 of the present disclosure selectively initiates an auto-stop event and/or an auto-start event based on various other parameters. For example, the auto-start/stop module 180 may selectively initiate an auto-stop event and/or an auto-start event based on one or more parameters provided by the cruise control module 154 and/or one or more parameters provided by a navigation module 184.

For example only, the auto-stop/start module 180 may selectively initiate an auto-stop event and/or an auto-start event based on a likelihood that a driver will initiate a change of path (e.g., lane or surface designated for driving) and a distance to an object in a present path the vehicle provided by the cruise control module 154. One or more transceivers 156 may be associated with the cruise control module 154. For example only, the transceivers 156 may include laser based transceivers, radar based transceivers, or another suitable type of transceivers.

The transceivers 156 generate signals that are used to locate and track the position of objects (e.g., other vehicles and other types of objects) that are in front of, behind, and/or beside the vehicle. The transceivers 156 provide reflected signals to the cruise control module 154 based on signals reflected back to the transceivers 156. The cruise control module 154 may identify objects that are in front of, behind, and/or beside the vehicle and determine the distance to one or more objects based on the reflected signals.

The cruise control module 154 may determine the path (e.g., lane) of the vehicle on a road surface based on reflected signals from one or more of the transceivers 156, based on signals provided by the navigation module 184, and/or signals from one or more other suitable sources. The signals from the navigation module 184 may be provided by one or more exterior imaging devices 188 (e.g., cameras). The imaging devices 188 may be implemented to capture images from in front of, beside, and/or behind the vehicle and generate imaging signals. The cruise control module 154 may determine the path of the vehicle based on one or more identifiers in the images, such as lane lines. The navigation module 184 may selectively display video images of in front of, beside, and/or behind the vehicle on one or more displays (not shown) of the vehicle. For example only, the navigation module 184 may display a video image of behind the vehicle when the driver selects reverse using a park, reverse, neutral, drive lever (PRNDL) (not shown).

The auto-stop/start module 180 may additionally or alternatively initiate an auto-stop event and/or an auto-start event based on a distance between the vehicle and a predetermined stopping location in a path of the vehicle (e.g., a stop sign, a yield sign, etc.), a road grade, a traffic flow, and/or one or more other suitable parameters. The distance to the predetermined stopping location, the road grade, and the traffic flow may be determined by and provided to the ECM 130 by the navigation module 184.

The navigation module 184 may include or be used in conjunction with a global positioning system (GPS). The GPS may determine a location of the vehicle based on signals from various satellites. The navigation module 184 may determine a heading of the vehicle based on monitoring the location of the vehicle. Based on pre-stored maps of roads, the vehicle location, and the heading, the navigation module 184 may determine a grade of the road at the location of the vehicle based on pre-stored data regarding grade of the roads.

Selectively initiating auto-stop events based on the distance to an object in a path of the vehicle and/or based on a distance to a predetermined stopping location may enable the auto-stop/start module 180 to initiate an auto-stop event sooner than if based on the BPP. Additionally, selectively initiating an auto-start event based on the distance to an object in the path of the vehicle may enable the auto-stop/start module 180 to re-start the engine 102 sooner than if based on the BPP. For example only, the auto-stop/start module 180 may initiate an auto-start event when the distance between the vehicle and the object in the path of the vehicle increases (e.g., which may indicate that the object is moving away from the vehicle). The ability to initiate auto-stop and auto-start events sooner may provide an increase in fuel economy, render the engine 102 available to output torque sooner, and/or provide one or more other benefits.

Figure 2:
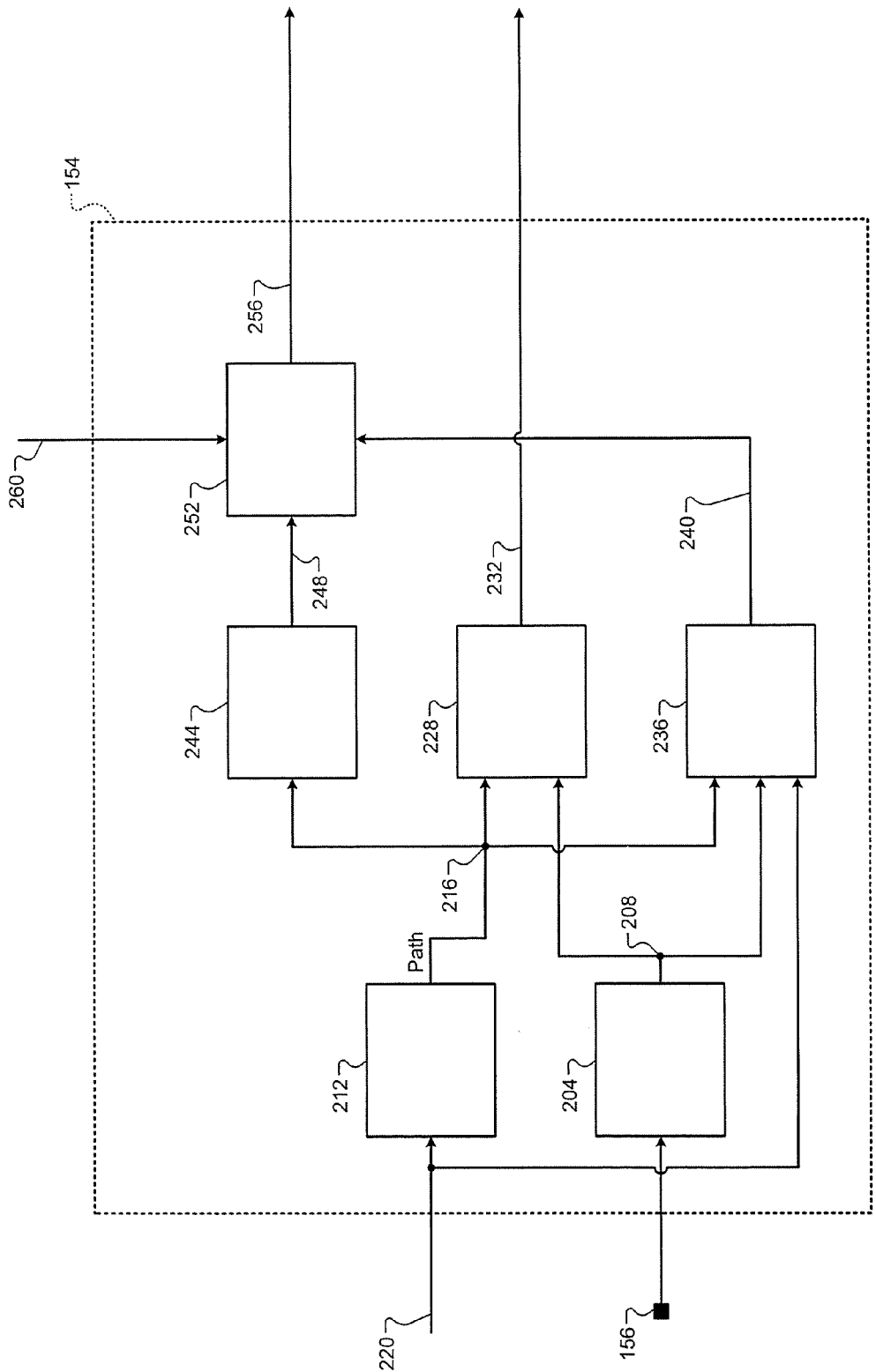
FIG. 2 is a functional block diagram of a cruise control module according to the present disclosure.

Referring now to FIG. 2, a functional block diagram of an example implementation of the cruise control module 154 is presented. An object identification module 204 identifies objects that are in front of, behind, and/or beside the vehicle based on the reflected signals from the transceivers 156. The object identification module 204 may identify objects that extend to at least a predetermined distance above the surface of the road in various implementations. The object identification module 204 outputs object location data 208 that indicates the locations of one or more objects that are in front of, behind, and/or beside the vehicle with respect to the location of the vehicle.

A path determination module 212 determines a path 216 of the vehicle on the road based on one or more inputs. For example only, the path determination module 212 may determine the path 216 of the vehicle based on imaging data 220 captured via the imaging devices 188. The path determination module 212 may additionally or alternatively determine the path 216 of the vehicle based reflected signals from one or more of the transceivers 156 and/or one or more other suitable inputs. The path 216 of the vehicle may refer to a portion of the road (e.g., a lane) that the vehicle may occupy in the future if the driver maintains the current orientation of the vehicle on the road.

A first distance determination module 228 may receive the object location data 208 and the path 216. The first distance determination module 228 determines whether one or more of objects identified by the object identification module 204 indicated in the object location data 208 are located in the path 216 of the vehicle. The first distance determination module 228 determines a first distance 232 between the vehicle and an object that is located in the path 216 of the vehicle. In various implementations, the first distance determination module 228 may determine a distance between the vehicle and an object that is located in the path 216 of the vehicle for each object that is located in the path 216 of the vehicle. The first distance determination module 228 may compare the distances and set the first distance 232 equal to a smallest one of the distances. In other words, the first distance determination module 228 may set the first distance 232 equal to the distance between the vehicle and the closest one of the objects in the path 216 of the vehicle. The first distance 232 may correspond to a traveling distance of the vehicle along the path 216 (as opposed to a straight line path) between the vehicle and the closest one of the objects in the path 216 of the vehicle.

An alternate path module 236 may also receive the object location data 208 and the path 216. The alternate path module 236 may also receive the imaging data 220. The alternate path module 236 may determine whether an alternate path is available for the vehicle to occupy based on the imaging data 220. For example only, the alternate path may refer to a path of the vehicle, other than the path 216 of the vehicle, that the vehicle could occupy in the future if the driver changes the path 216 of the vehicle.

When an alternate path is available, the alternate path module 236 may determine whether one or more objects (e.g., vehicles) are in the alternate path, locations of the one or more objects, distances to the one or more objects that are in the alternate path, and rates (speed) that the one or more objects are approaching the vehicle or moving. The alternate path module 236 generates alternate path data 240 indicating whether an alternate path is available for the vehicle to occupy, whether one or more objects are located in the alternate path, the locations of the one or more objects that are located in the alternate path, the distances to the one or more objects that are located in the alternate path, and the rates that the one or more objects are approaching the vehicle.

A path change detection module 244 receives the path 216 of the vehicle indicated by the path determination module 212. The path change detection module 244 indicates when the driver changes the path 216 of the vehicle based on the path 216. The path change detection module 244 indicates when the driver changes the path 216 using a path change signal 248. For example only, the path change detection module 244 may set the path change signal 248 to an active state to indicate that the driver changed the path 216 of the vehicle.

A path change likelihood module 252 may generate a path change likelihood value 256 based on the alternate path data 240 and vehicle speed 260 measured using the vehicle speed sensor 152. The path change likelihood value 256 may be a value corresponding to between a 0 percent likelihood and a 100 percent likelihood that indicates how likely the driver is to change the path 216 of the vehicle. For example only, the path change likelihood module 252 may adjust the path change likelihood value 256 toward the value corresponding to a 100 percent likelihood as a lesser number of objects are located in an alternate path. The path change likelihood module 252 may additionally or alternatively adjust the path change likelihood value corresponding to a 100 percent likelihood as the distance between the vehicle and an object (e.g., a closest object) in the alternate increases. The path change likelihood module 252 may additionally or alternatively adjust the path change likelihood value corresponding to a 100 percent likelihood as a rate that an object (e.g., a closest object) in the alternate path approaches the vehicle decreases.

The path change likelihood module 252 may adjust the path change likelihood value 256 toward the value corresponding to a 0 percent likelihood as a greater number of objects are located in an alternate path. The path change likelihood module 252 may additionally or alternatively adjust the path change likelihood value 256 toward the value corresponding to a 0 percent likelihood as the distance between the vehicle and an object (e.g., a closest object) in the alternate decreases. The path change likelihood module 252 may additionally or alternatively adjust the path change likelihood value 256 toward the value corresponding to a 0 percent likelihood as a rate that an object (e.g., a closest object) in the alternate path approaches the vehicle increases. The path change likelihood module 252 may additionally or alternatively adjust the path change likelihood value 256 toward the value corresponding to a 0 percent likelihood as the vehicle speed decreases and vice versa.

The path change likelihood module 252 may generate the path change likelihood value 256 further based on one or more previous changes of the path 216 of the vehicle indicated via the path change signal 248. In other words, the path change likelihood module 252 may generate the path change likelihood value 256 further based on the tendency of the driver to change the path 216 of the vehicle in the past when objects are present in the path 216 of the vehicle. For example only, the path change likelihood module 252 may adjust the path change likelihood value 256 toward the value corresponding to the 100 percent likelihood when the number of instances when the driver changed the path 216 of vehicle in response to an object being in the path 216 of the vehicle increases and vice versa.

The auto-stop/start module 180 may selectively initiate auto-stop and/or auto-start events based on the first distance 232 and/or the path change likelihood value 256.

Figure 3:
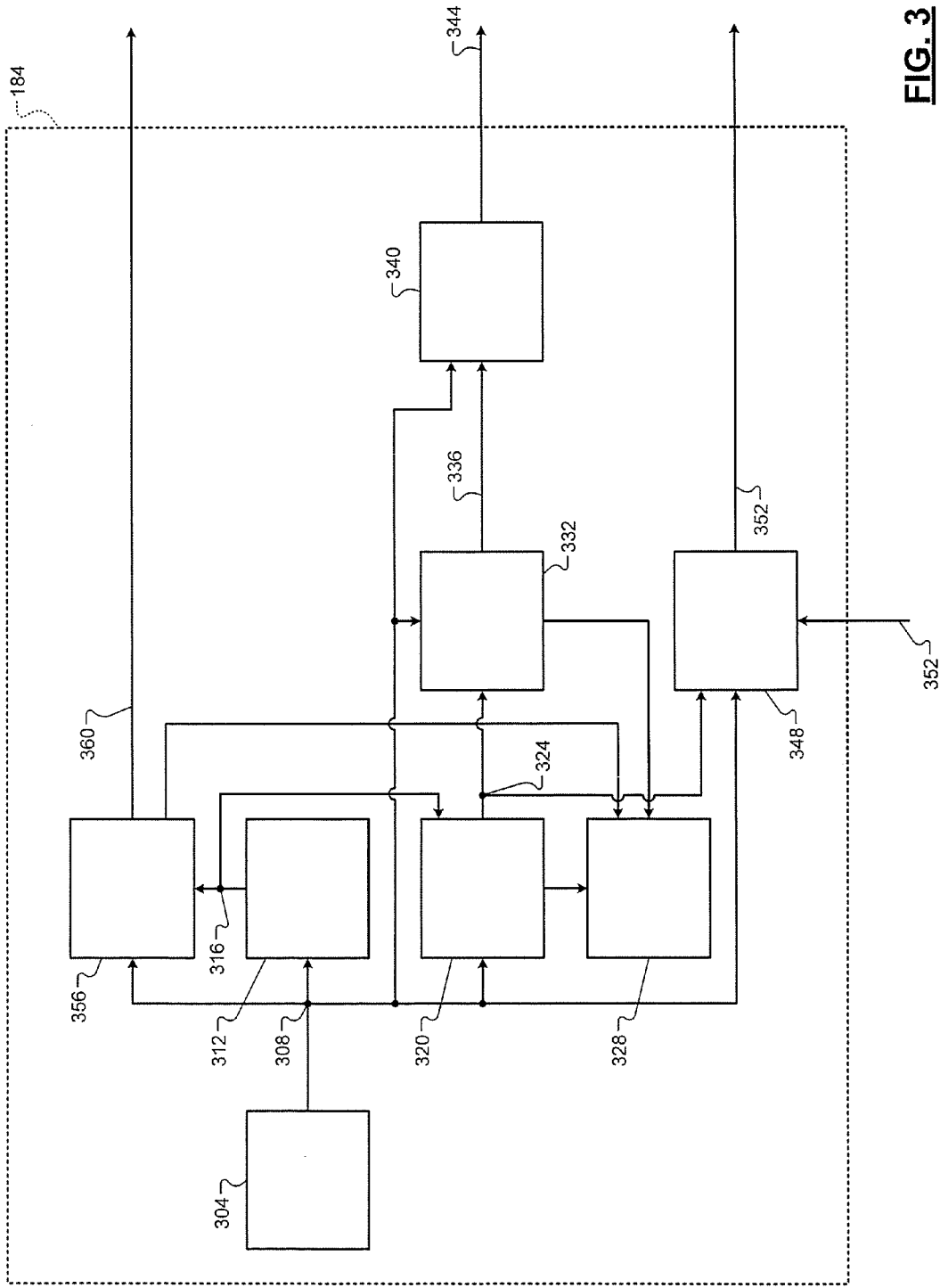
FIG. 3 is a functional block diagram of an example navigation module according to the present disclosure.

Referring now to FIG. 3, a functional block diagram of an example implementation of the navigation module 184 is presented. A GPS module 304 may determine a location 308 of the vehicle based on signals from a plurality of satellites (not shown). For example only, the location 308 may include a latitudinal and longitudinal coordinate of the vehicle or another suitable indicator of the location of the vehicle.

A heading determination module 312 may identify a heading 316 of the vehicle based on the location 308. For example only, the heading determination module 312 may identify the heading 316 based on the present value of the location 308 and one or more previous values of the location 308.

A path determination module 320 may determine a second path 324 of the vehicle on the road based on the location 308. The path determination module 320 may determine the second path 324 of the vehicle further based on the heading 316, pre-stored roadway data, and/or one or more other suitable parameters. The pre-stored roadway data may be stored in a memory 328 of the vehicle or in another suitable location. The pre-stored roadway data may include locations of identified roads in a particular area of the world (e.g., a country), the entire world, or another suitable area. The second path 324 of the vehicle may refer to a portion of the road (e.g., a lane) that the vehicle may occupy in the future.

A stopping location determination module 332 determines a stopping location 336 of the vehicle. The stopping location 336 may correspond to a location where the driver may stop the vehicle in the future if the second path 324 is followed. The stopping location determination module 332 may also determine one or more additional stopping locations. The stopping location 336 may be a closest location to the present value of the location 308 where the driver may stop the vehicle in the future if the second path 324 is followed. The stopping location determination module 332 may determine the stopping location 336 using a mapping of pre-stored stopping locations indexed by location.

For example only, the mapping of pre-stored stopping locations may be stored in the memory 328. The pre-stored stopping locations may include, for example, locations of stop signs, locations of yield signs, and locations of other places where drivers of vehicles are to stop the vehicle. The stopping location determination module 332 may determine the stopping location 336 using the mapping of pre-stored stopping locations based on the location 308 and the second path 324 of the vehicle. The stopping location 336 may correspond to the closest location to the location 308 that is in the second path 324 of the vehicle where the driver should stop the vehicle.

A second distance determination module 340 may determine a second distance 344. The second distance determination module 340 determines the second distance 344 between the vehicle and the stopping location 336. The second distance 344 may correspond to a traveling distance of the vehicle along the second path 324 (as opposed to a straight line path) where the driver should stop the vehicle.

A traffic flow determination module 348 may obtain traffic flow data 352 wirelessly. The traffic flow data 352 may indicate a speed (e.g., an average speed) of other vehicles within a predetermined distance of the vehicle. The traffic flow data 352 may be obtained based on the location 308 of the vehicle. The traffic flow data 352 may be obtained further based on the second path 324 of the vehicle. For example only, the traffic flow determination module 348 may obtain the traffic flow data 352 via a wireless data provider based on the location 308 and the second path 324 of the vehicle, such as via an Onstar server, the GPS module 304, vehicle-to-vehicle (V2V) communications systems, dedicated short range communications (DSRC) (e.g., vehicle-to-infrastructure systems), or another suitable wireless traffic data provider.

A grade determination module 356 determines a grade (e.g., pitch) 360 of the road at the location 308 of the vehicle. The grade determination module 356 may determine the grade 360 of the road at the location 308 of the vehicle using pre-stored road grade data. For example only, the pre-stored road grade data may be stored in the memory 328. The pre-stored road grade data may include, for example, a mapping of road grades indexed by location.

The grade determination module 356 may determine the grade 360 using the pre-stored road grade data based on the location 308. The grade determination module 356 may determine the grade 360 further based on the second path 324 of the vehicle. When the location 308 of the vehicle is between two locations of the mapping, the grade determination module 356 may determine the grade 360, for example, using interpolation or in another suitable manner. The grade 360 may be expressed in terms of the grade of the road in the direction (e.g., forward) that the vehicle is traveling.

The navigation module 184 may output the second distance 344, the traffic flow data 352, and/or the grade 360. The auto-stop/start module 180 may selectively initiate auto-stop and/or auto-start events additionally or alternatively based on the second distance 344, the traffic flow data 352, and/or the grade 360.

Figure 4:
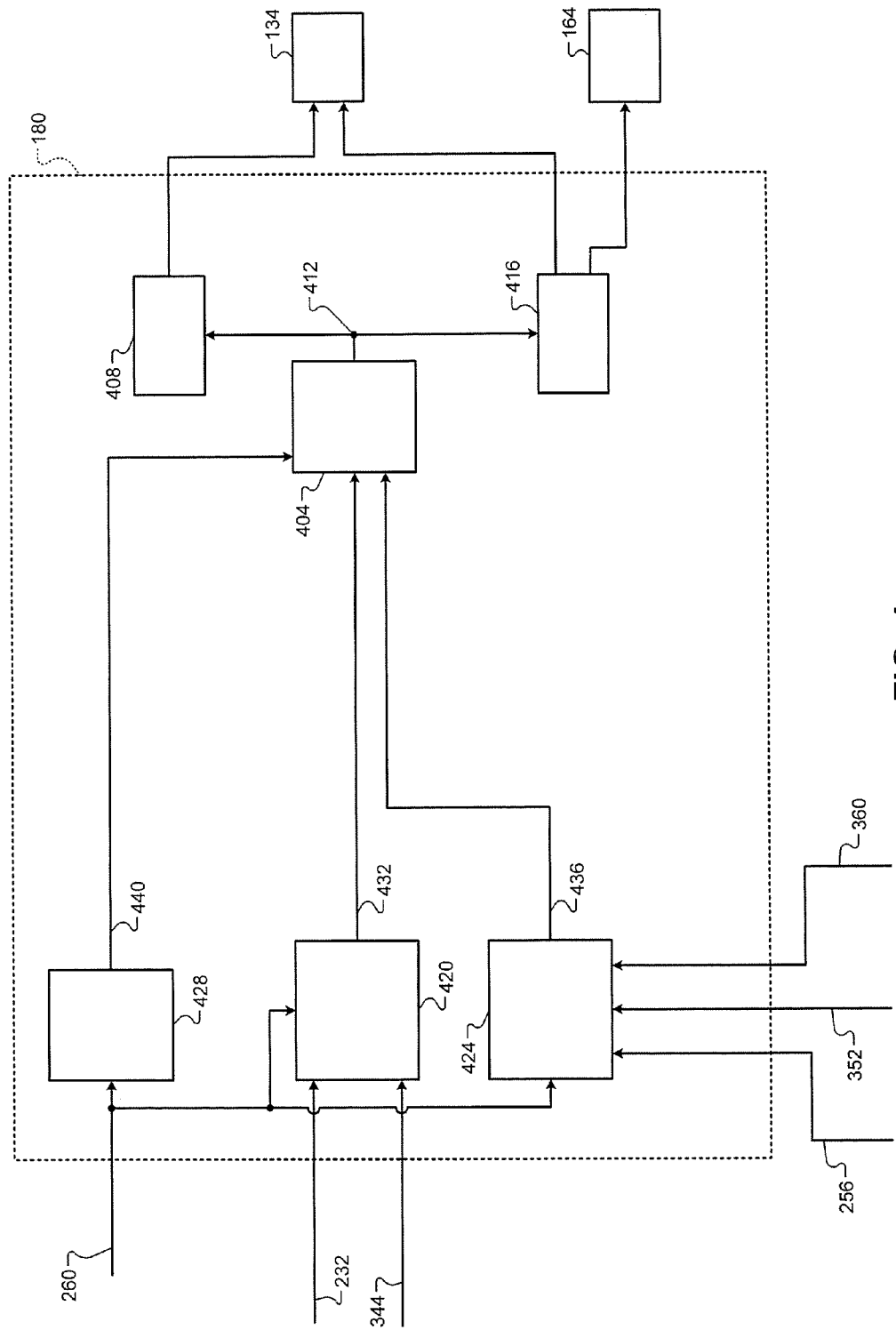
FIG. 4 is a functional block diagram of an example auto-stop/start module according to the present disclosure.

Referring now to FIG. 4, a functional block diagram of an example implementation of the auto-stop/start module 180 is presented. An auto-stop/start control module 404 controls when auto-stop and auto-start events are performed for auto-stop/start events while the ignition system of the vehicle is ON (e.g., key ON). More specifically, for a given auto-stop/start event, the auto-stop/start control module 404 first triggers an auto-stop module 408 to initiate an auto-stop event of the auto-stop/start event. The auto-stop/start control module 404 may trigger the auto-stop module 408, for example, using an auto-stop/start signal 412, and the auto-stop module 408 may be triggered by the auto-stop/start signal 412 being set to a predetermined value.

The auto-stop module 408 disables the provision of fuel to the engine 102 when triggered by the auto-stop/start control module 404. The auto-stop module 408 may also take one or more actions in response to being triggered by the auto-stop/start control module 404, such as disabling spark, returning the throttle valve 106 to a predetermined position, and/or one or more other suitable actions. The engine speed slows when the provision of fuel to the engine 102 is disabled during the auto-stop event, and the engine speed may reach approximately zero during the auto-stop event.

The auto-stop/start control module 404 later (after triggering the auto-stop module 408) disables the auto-stop module 408 and triggers an auto-start module 416 to initiate an auto-start event of the auto-stop/start event. In various implementations, the auto-stop/start control module 404 may trigger the auto-start module 416 using the auto-stop/start signal or another suitable signal. For example only, the auto-stop/start control module 404 may trigger the auto-start module 416 by setting the auto-stop/start signal 412 to a second predetermined value that is different than the predetermined value that triggers the auto-stop module 408.

The auto-start module 416 re-enables the provision of fuel to the engine 102 when triggered by the auto-stop/start control module 404. The auto-start module 416 engages the starter motor 160 with the engine 102 when triggered by the auto-stop/start module control 404 and applies current to the starter motor 160 when triggered by the auto-stop/start control module 404. In this manner, the auto-start module 416 re-starts the engine 102 so the engine 102 can produce torque based on the driver inputs.

The auto-stop/start module 180 of the present disclosure may include a period determination module 420, a threshold determination module 424, and a timer module 428. The period determination module 420 may receive the first and second distances 232 and 344. As described above, the first distance 232 may correspond to a distance between the vehicle and a closest object that is in the path 216 of the vehicle. The second distance 344 may correspond to a distance between the vehicle and closest pre-stored stopping location that is in the second path 324 of the vehicle.

The period determination module 420 may select one of the first and second distances 232 and 344. For example only, the period determination module 420 may select the one of the first and second distances 232 and 344 that is smaller (i.e., closer to the location of the vehicle). The period determination module 420 may determine a period 432 until the vehicle will be stopped based on the selected one of the first and second distances 232 and 344 and the vehicle speed 260 measured using the vehicle speed sensor 152. For example only, the period determination module 420 may set the period 432 based on or equal to the selected one of the first and second distances 232 and 344 divided by the vehicle speed 260. For example only, the period determination module 420 may set the period 432 based on or equal to 2 times the selected one of the first and second distances 232 and 344 divided by the vehicle speed 260. The period determination module 420 may also determine a period for the other one of the first and second distances 232 and 344 in various implementations.

The auto-stop/start control module 404 selectively triggers the auto-stop module 408 based on the period 432. In other words, the auto-stop/start control module 404 selectively initiates an auto-stop event based on the period 432 until the vehicle will be stopped. For example only, the auto-stop/start control module 404 may trigger the auto-stop module 408 when the period 432 is less than a threshold period 436.

The threshold determination module 424 determines the threshold period 436. The threshold determination module 424 may determine the threshold period 436 based on the vehicle speed 260 measured using the vehicle speed sensor 152 and one or more desired braking parameters, such as a maximum desired vehicle deceleration during vehicle braking. The maximum desired vehicle deceleration may be learned based on vehicle deceleration during vehicle braking previously performed, input by a driver, and/or obtained from one or more suitable sources.

The value of the threshold period 436 determined based on the vehicle speed 260 and the desired braking parameter(s) may be used as a baseline value for the threshold period 436. For example only, the threshold determination module 424 may determine the threshold period 436 using a mapping of threshold periods indexed by vehicle speed and desired braking parameter(s). For example only, the threshold period 436 may increase as the vehicle speed 260 increases, and vice versa.

The threshold determination module 424 may selectively adjust the threshold period 436 (from the baseline value) based on the path change likelihood value 256, the traffic flow data 352, and/or the grade 360 of the road. For example only, the threshold determination module 424 may decrease the threshold period 436 as the path change likelihood value 256 increases, and vice versa.

In this manner, the more likely it is that the driver will change the path of the vehicle before reaching the object or the stopping location in the path of the vehicle, the longer it is that the auto-stop/start control module 404 will wait (i.e., the period 432 will be closer to zero) before triggering an auto-stop event. Written in the alternative, the less likely it is that the driver will change the path of the vehicle before reaching the object or the stopping location, the sooner it is that the auto-stop/start control module 404 will trigger an auto-stop event.

The threshold determination module 424 may additionally or alternatively selectively adjust the threshold period 436 based on the grade 360. For example only, the threshold determination module 424 may increase the threshold period as the grade 360 decreases (including becoming more negative), and vice versa. In this manner, the more positive the grade 360 of the road, the longer it is that the auto-stop/start control module 404 will wait (i.e., the period 432 will be closer to zero) before triggering an auto-stop event. The longer wait may be attributable to the increased gravitational force opposing the vehicle when traveling up the positive grade. Written in the alternative, the more negative that the grade 360 of the road is, the sooner it is that the auto-stop/start control module 404 will trigger an auto-stop event.

The threshold determination module 424 may additionally or alternatively selectively adjust the threshold period 436 based on the traffic flow data 352. For example only, the threshold determination module 424 may decrease the threshold period 436 as the speed of traffic near the vehicle decreases, and vice versa. In this manner, the more likely it is that the driver will stop or slow the vehicle due to the flow of traffic, the sooner it is (i.e., when the period 432 is further from zero) that the auto-stop/start control module 404 will trigger an auto-stop event. Written in the alternative, the less likely it is that the driver will stop or slow the vehicle due to flow of traffic, the longer it is that the auto-stop/start control module 404 will wait before trigger an auto-stop event.

The timer module 428 may determine an estimated stopped period 440 based on the vehicle speed 260. For example only, the timer module 428 may reset a timer to a predetermined reset value each time that the vehicle speed 260 is approximately equal to zero (e.g., is less than a predetermined speed). The timer module 428 may monitor the timer value and store the timer value when the vehicle speed 260 begins to increase. In this manner, the timer module 428 may store how long the engine 102 was stopped before moving again. The timer module 428 may determine the estimated stopped period 440 based on one or more previous values of the timer value. The estimated stopped period 440 may correspond to how long the vehicle may be stopped at a given time.

The auto-stop/start control module 404 may selectively trigger auto-stop events and auto-start events based on the estimated stopped period 440. For example only, the auto-stop/start control module 404 may disable initiating an auto-start event when the estimated stopped period 440 is less than a predetermined period. When the vehicle is stopped for less than the predetermined period, the benefit(s) of performing an auto-stop event and a later auto-start event may be less than desired.

When the engine 102 is disabled during an auto-stop event, the auto-start/stop control module 404 may selectively wait to trigger an auto-start event based on the estimated stopped period 440. For example only, the auto-start/stop control module 404 may selectively wait to trigger an auto-start event until a period between a time when the vehicle speed became approximately zero and a present time is a predetermined percent of the estimated stopped period 440.

When the engine 102 is disabled during an auto-stop event, the auto-stop/start control module 404 may selectively trigger an auto-start event additionally or alternatively based on the period 432. For example only, the auto-stop/start control module 404 may selectively trigger an auto-start event at a time when the engine 102 is disabled during an auto-stop event when the period 432 increases by at least a predetermined amount. The period 432 increasing may indicate that, for example, the object that is located in the path of the vehicle is moving away from the vehicle and that the driver may wish to accelerate the vehicle.

When the engine 102 is disabled during an auto-stop event, the auto-stop/start control module 404 may selectively trigger an auto-start event additionally or alternatively based on the path change likelihood value 256. For example only, the auto-stop/start control module 404 may selectively trigger an auto-start event at a time when the engine 102 is disabled during an auto-stop event when the path change likelihood value 256 is greater than a predetermined value, such as a value corresponding to a 75 percent likelihood.

Figure 5:
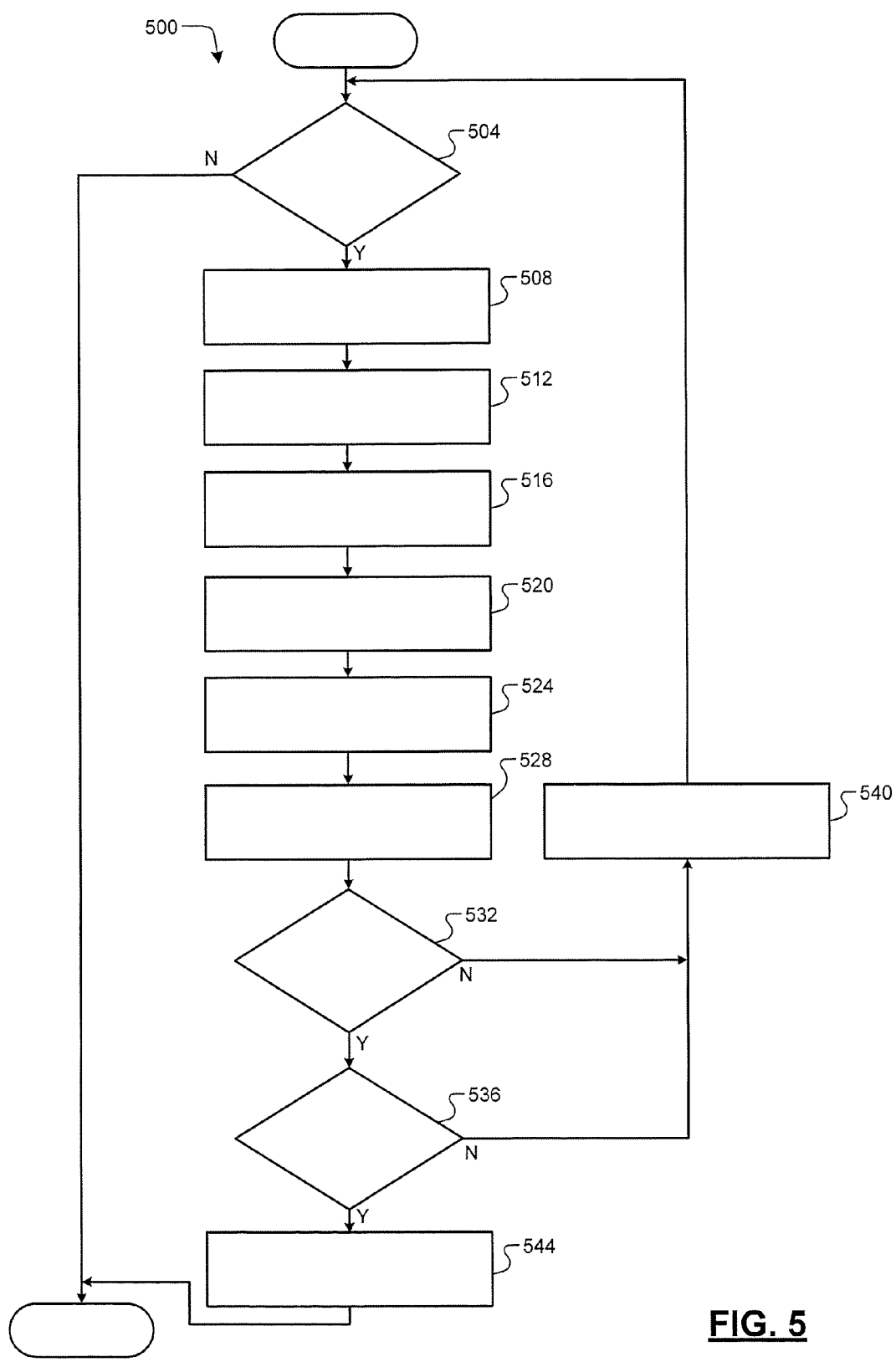
FIGS. 5-7 are flowcharts depicting example methods of initiating auto-stop events and auto-start events according to the present disclosure.

Referring now to FIG. 5, a flowchart depicting an example method 500 of initiating an auto-stop event is presented. Control may begin with 504 where control determines whether the vehicle is still ON (e.g., whether the ignition system of the vehicle is still ON). If true, control may continue with 508; if false, control may end. At 508, control may determine the first and second distances 232 and 344. Control identifies objects in the path 216 of vehicle based on inputs from one or more intelligent cruise control devices, such as laser or radar transceivers. Control may set the first distance 232 as the distance between the vehicle and a closest one of the identified objects that is located in the path 216 of the vehicle. Control obtains the location 308 of the vehicle from a GPS, such as the GPS module 304, and determines stopping locations from a pre-stored mapping of stopping locations. Control may set the second distance 344 as the distance between the vehicle and a closest one of the stopping locations.

Control may determine the path change likelihood value 256 at 512. Control may also determine the grade 360 of the road at the location 308 of the vehicle at 512. Control may determine the grade 360 based on the location 308 using the pre-stored mapping of road grade data. Control may obtain the traffic flow data 352 at 516. Control receives the traffic flow data 352 wirelessly from a wireless traffic flow data provider.

At 520, control may determine the period 432 until the vehicle will be stopped. In other words, control may determine the period 432 until the vehicle will have traveled a distance equal to a closer (smaller) one of the first and second distances 232 and 344. Control may determine the period 432 based on the vehicle speed 260 and the closer one of the first and second distances 232 and 344 to the vehicle. For example only, control may set the period 432 equal to 2 times the closer one of the first and second distances 232 and 344 divided by the vehicle speed 260.

Control may determine the threshold period 436 at 524. Control may determine the threshold period 524 based on the desired braking characteristics and the vehicle speed 260. Control may selectively adjust the threshold period 436 at 528. For example only, control may adjust the threshold period 436 based on the path change likelihood value 256, the traffic flow data 352, and/or the grade 360. Control may, for example, increase the threshold period 436 as the likelihood that the driver will change the path 216 of the vehicle decreases and vice versa. Additionally or alternatively, control may, for example, increase the threshold period 436 as the grade 360 increases and vice versa. Additionally or alternatively, control may, for example, increase the threshold period 436 as the speed of traffic in the path of the vehicle decreases and vice versa.

Control may determine whether the period 432 is less than the threshold period 436 at 532. If true, control may continue with 536; if false, control may wait to trigger an auto-stop event unless one or more auto-stop event triggering conditions are satisfied at 540 and return to 504. At 536, control may determine whether the estimated stopped period 440 is greater than the predetermined period. If true, control may selectively initiate an auto-stop event at 544; if false, control may wait to trigger an auto-stop event unless one or more auto-stop event triggering conditions are satisfied at 540 and return to 504.

Figure 6:
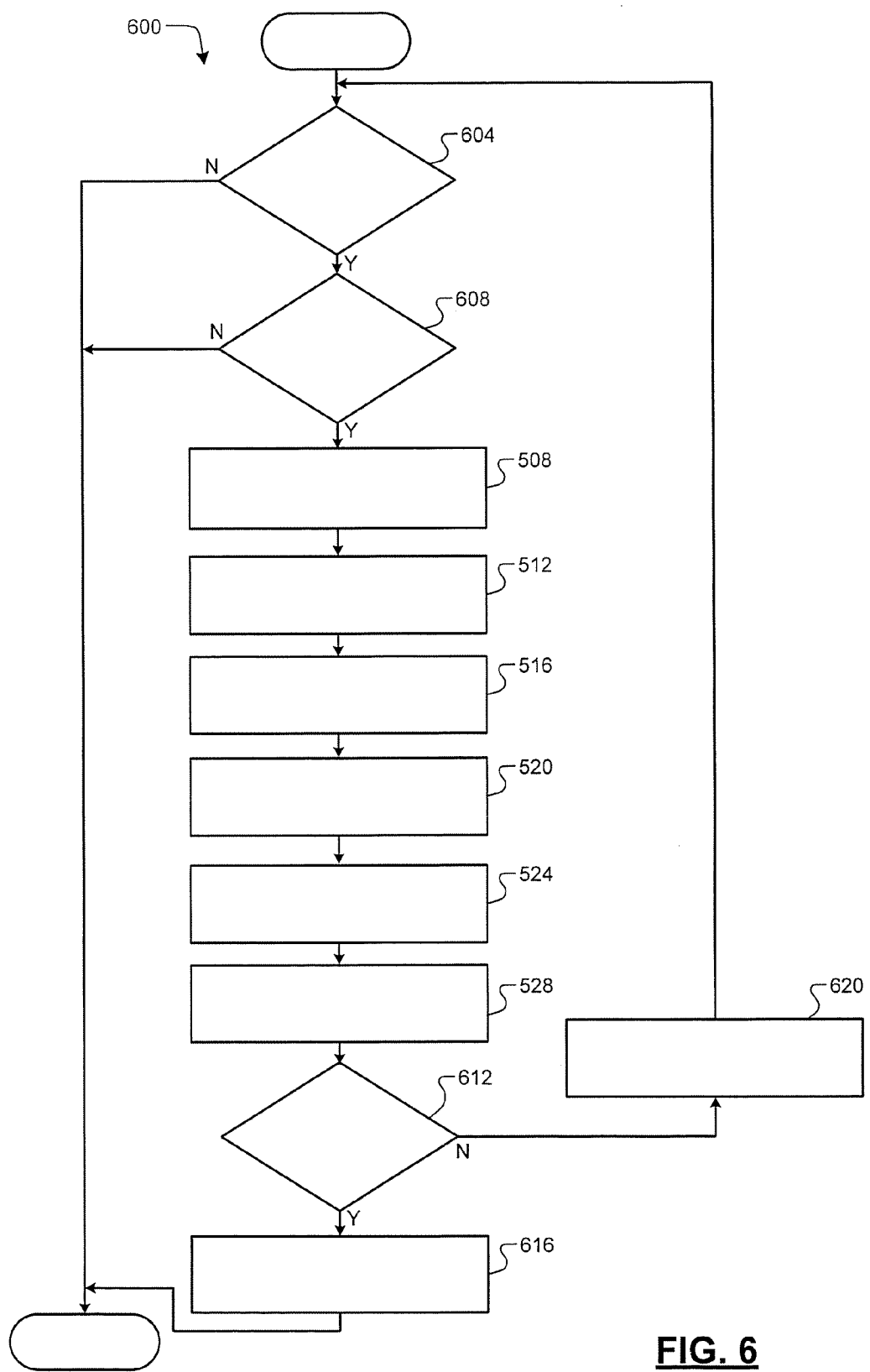

Referring now to FIG. 6, a flowchart depicting an example method 600 of initiating an auto-start event is presented. Control may begin with 604 where control determines whether the vehicle is ON. If true, control may continue with 608; if false, control may end. At 608, control may determine whether the engine 102 is OFF for an auto-stop event. If true, control may perform 508-528 as discussed above and continue with 612. If false, control may end.

At 612, control may determine whether the period 432 is less than the threshold period 436. If true, control may selectively trigger an auto-start event at 616 and start the engine 102. If false, control may wait to trigger an auto-start event unless one or more auto-stop event triggering conditions are satisfied at 620 and return to 604. As control may selectively adjust the threshold period 436 at 528, control may change the threshold period 436 as, for example, speed of traffic near the vehicle changes and/or as the likelihood that the driver will change the path of the vehicle increases.

Figure 7:
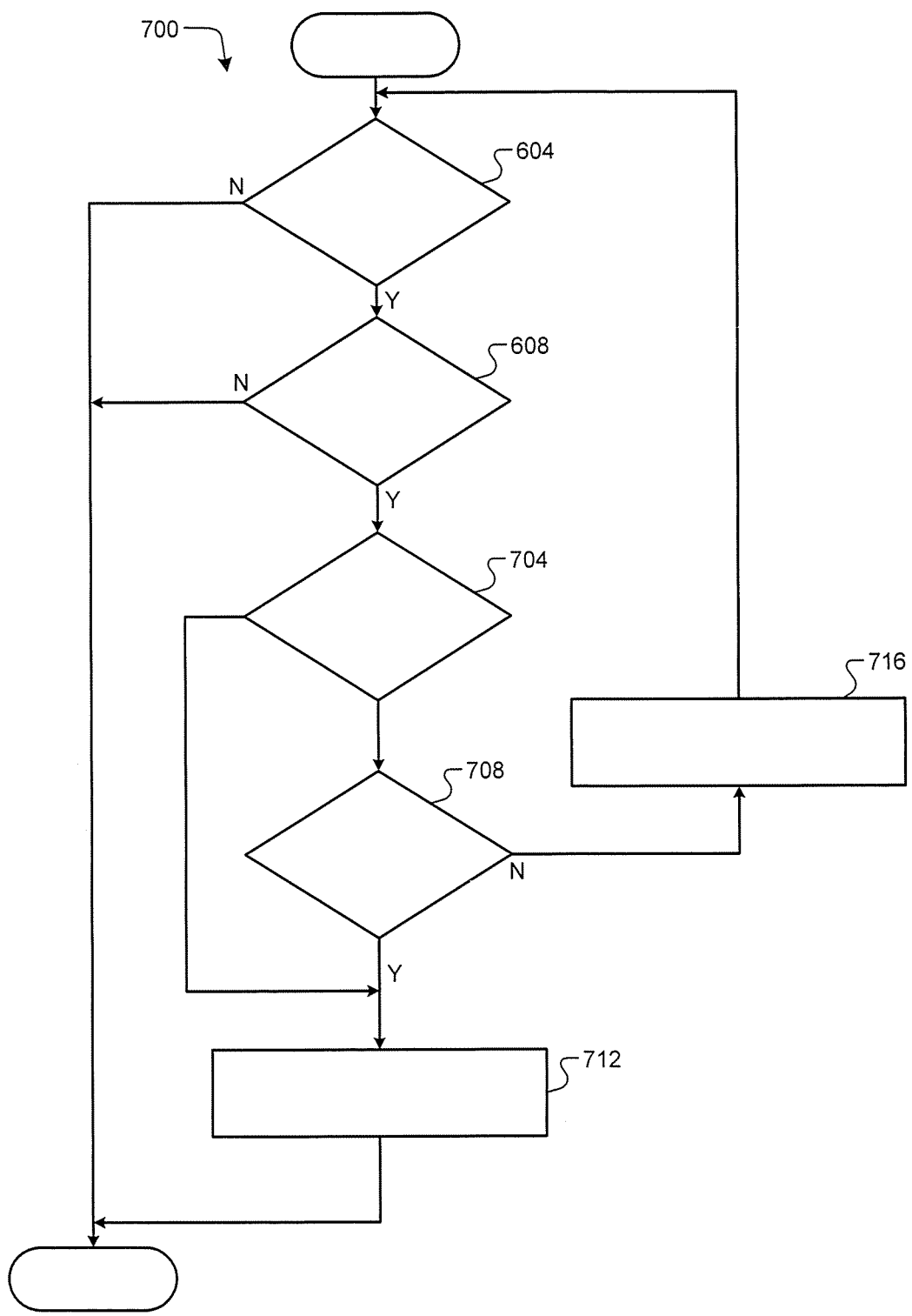

Referring now to FIG. 7, a flowchart depicting another example method 700 of initiating an auto-start event is presented. Control may begin with 604 where control determines whether the vehicle is ON. If true, control may continue with 608; if false, control may end. At 608, control may determine whether the engine 102 is OFF for an auto-stop event. If true, control may continue with 704; if false, control may end.

At 704, control may determine whether the closest (smallest) one of the first and second distances 232 and 344 increased from a previous (e.g., last) control loop. If true, control may selectively trigger an auto-start event at 712; if false, control may continue with 708. Control may determine whether the likelihood that the driver will change the path of the vehicle has increased at 708. If true, control may selectively initiate an auto-start event at 712; if false, control may wait to initiate an auto-start event unless one or more auto-start triggering conditions are satisfied at 716 and return to 604. In various implementations, control may determine whether the path change likelihood value has become greater than a predetermined value (e.g., 75 percent or another suitable value) at 708.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An auto-stop/start system for a vehicle, comprising:
   an object identification module that determines a location of an object that is in a path of the vehicle;
   a distance determination module that determines a distance between the vehicle and the location of the object;
   a period determination module that determines a period based on a speed of the vehicle and the distance between the vehicle and the location; and
   an auto-stop/start control module that selectively disables provision of fuel to an engine of the vehicle while an ignition system of the vehicle is ON based on the distance and that selectively disables the provision of fuel to the engine when the period is less than a threshold period,
   wherein the threshold period is greater than zero.

2. The auto-stop/start system of claim 1 wherein, after disabling the provision of fuel to the engine, the auto-stop/start control module selectively re-enables the provision of fuel to the engine based on the distance.

3. The auto-stop/start system of claim 2 wherein the auto-stop/start control module re-enables the provision of fuel to the engine when the distance increases.

4. The auto-stop/start system of claim 1 further comprising:
   a stopping location determination module that determines a second location that is in a second path of the vehicle based on a pre-stored mapping of locations where a driver of the vehicle may stop the vehicle and based on a vehicle location determined by a global positioning system (GPS); and
   a second distance determination module that determines a second distance between the vehicle location and the second location,
   wherein the auto-stop/start control module selectively disables the provision of fuel to the engine while the ignition system is ON further based on the second distance.

5. The auto-stop/start system of claim 4 wherein, after disabling the provision of fuel to the engine, the auto-stop/start control module selectively re-enables the provision of fuel to the engine based on the second distance.

6. The auto-stop/start system of claim 1 further comprising wherein the period determination module sets the period equal to 2 times the distance divided by the speed.

7. The auto-stop/start system of claim 1 further comprising:
   a path change likelihood value that determines a value corresponding to a likelihood that a driver will change the path of the vehicle before the vehicle reaches the location; and
   a threshold determination module that determines the threshold period based on the value.

8. The auto-stop/start system of claim 7 wherein the threshold determination module decreases the threshold period as the likelihood that the driver will change the path of the vehicle increases.

9. The auto-stop/start system of claim 1 further comprising:
   a grade determination module that receives a vehicle location determined by a global positioning system (GPS) and that determines a grade of a road at the vehicle location based on a pre-stored mapping of the grade indexed by the vehicle location; and
   a threshold determination module that determines the threshold period based on the grade of the road.

10. An auto-stop/start method for a vehicle, comprising:
    determining a location of an object that is in a path of the vehicle;
    determining a distance between the vehicle and the location of the object;
    determining a period based on a speed of the vehicle and the distance between the vehicle and the location; and
    while an ignition system of the vehicle is ON, selectively disabling provision of fuel to an engine of the vehicle based on the distance and selectively disabling the provision of fuel to the engine when the period is less than a threshold period,
    wherein the threshold period is greater than zero.

11. The auto-stop/start method of claim 10 further comprising, after disabling the provision of fuel to the engine, selectively re-enabling the provision of fuel to the engine based on the distance.

12. The auto-stop/start method of claim 11 further comprising re-enabling the provision of fuel to the engine when the distance increases.

13. The auto-stop/start method of claim 10 further comprising:
    determining a second location that is in a second path of the vehicle based on a pre-stored mapping of locations where a driver of the vehicle may stop the vehicle and based on a vehicle location determined by a global positioning system (GPS);
    determining a second distance between the vehicle location and the second location; and
    while the ignition system is ON, selectively disabling the provision of fuel to the engine further based on the second distance.

14. The auto-stop/start method of claim 13 further comprising, after disabling the provision of fuel to the engine, selectively re-enabling the provision of fuel to the engine based on the second distance.

15. The auto-stop/start method of claim 10 further comprising setting the period equal to 2 times the distance divided by the speed.

16. The auto-stop/start method of claim 10 further comprising:
   determining a value corresponding to a likelihood that a driver will change the path of the vehicle before the vehicle reaches the location; and
   determining the threshold period based on the value.

17. The auto-stop/start method of claim 16 further comprising decreasing the threshold period as the likelihood that the driver will change the path of the vehicle increases.

18. The auto-stop/start method of claim 10 further comprising:
   receiving a vehicle location determined by a global positioning system (GPS);
   determining a grade of a road at the vehicle location based on a pre-stored mapping of the grade indexed by the vehicle location; and
   determining the threshold period based on the grade of the road.

19. An auto-stop/start system for a vehicle, comprising:
   an object identification module that determines a location of an object that is in a path of the vehicle;
   a distance determination module that determines a distance between the vehicle and the location of the object;
   an auto-stop/start control module that selectively disables provision of fuel to an engine of the vehicle while an ignition system of the vehicle is ON based on the distance;
   a stopping location determination module that determines a second location that is in a second path of the vehicle based on a pre-stored mapping of locations where a driver of the vehicle may stop the vehicle and based on a vehicle location determined by a global positioning system (GPS); and
   a second distance determination module that determines a second distance between the vehicle location and the second location,
   wherein the auto-stop/start control module selectively disables the provision of fuel to the engine while the ignition system is ON further based on the second distance.

20. An auto-stop/start method for a vehicle, comprising:
   determining a location of an object that is in a path of the vehicle;
   determining a distance between the vehicle and the location of the object;
   while an ignition system of the vehicle is ON, selectively disabling provision of fuel to an engine of the vehicle based on the distance;
   determining a second location that is in a second path of the vehicle based on a pre-stored mapping of locations where a driver of the vehicle may stop the vehicle and based on a vehicle location determined by a global positioning system (GPS);
   determining a second distance between the vehicle location and the second location; and
   while the ignition system is ON, selectively disabling the provision of fuel to the engine further based on the second distance.

\* \* \* \* \*